No. 834,799. PATENTED OCT. 30, 1906.
J. HARTIGAN.
WRENCH.
APPLICATION FILED JAN. 26, 1906.
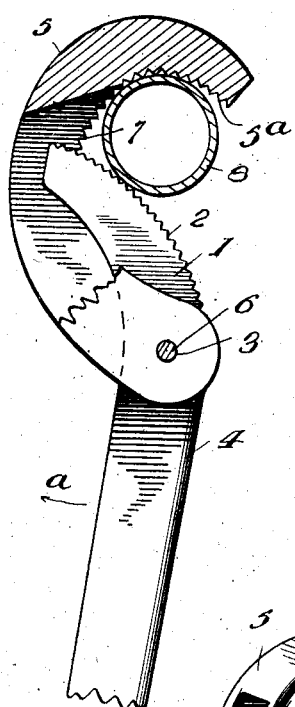
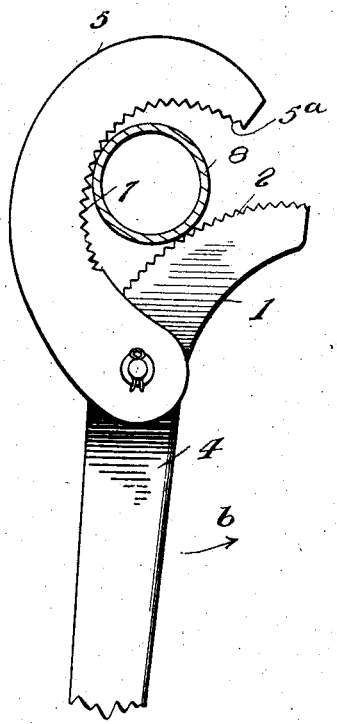
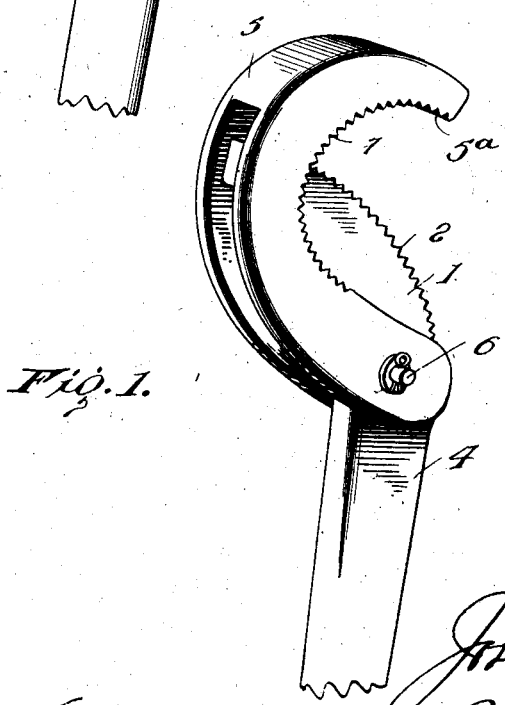
Witnesses
Inventor
Joseph Hartigan
By
Attorney

UNITED STATES PATENT OFFICE.

JOSEPH HARTIGAN, OF MOUNT PLEASANT, PENNSYLVANIA, ASSIGNOR OF ONE-FOURTH TO J. P. KELLER, OF MOUNT PLEASANT, PENNSYLVANIA.

WRENCH.

No. 834,799.　　　Specification of Letters Patent.　　　Patented Oct. 30, 1906.

Application filed January 26, 1906. Serial No. 298,051.

*To all whom it may concern:*

Be it known that I, JOSEPH HARTIGAN, a citizen of the United States, residing at Mount Pleasant, in the county of Westmoreland and State of Pennsylvania, have invented new and useful Improvements in Wrenches, of which the following is a specification.

This invention relates to improvements in pipe-wrenches.

The object of the improvement is to provide a readily-removable jaw provided on one face with a series of teeth so arranged as to enable an operator to change the direction of rotation of the pipe by simply reversing the position of the jaw.

Other objects and advantages will be hereinafter referred to and particularly pointed out in the claims.

In the drawings, Figure 1 is a perspective view of my improved wrench. Fig. 2 is an elevation of the same, the parts being positioned to turn a pipe toward the left. Fig. 3 is a similar view, the jaw being reversed to turn a pipe toward the right.

The numeral 1 represents a curved jaw provided with a series of teeth 2 on its convex edge and formed with an opening 3 and a handle 4. A hook-shaped coöperating jaw 5 is pivoted to jaw 1 by a detachable pin 6, passing through jaw 5 and opening 3. Jaw 5 is bifurcated at its lower portion to receive jaw 1, and its inner concaved surface is provided with a series of serrations or teeth 7.

When it is desired to turn a pipe toward the left, as shown in Fig. 2, pipe 8 is caught between the teeth 7 of the inner concaved edge of jaw 5 at the outer hooked end 5ª and the upper tooth convexed edge of jaw 1. When the handle 4 is turned in direction of arrow *a*, the teeth 2 crowd pipe against teeth 7, where it is gripped. Consequently the greater the pressure applied to the handle the firmer the pipe is held. The firm grip of the pipe by the jaws insures of the pipe being turned.

It frequently happens that the movement of a pipe is to be reversed, and to conveniently and readily accomplish such a movement is the prime object of this invention. To reverse the movement, pin 6 is removed and jaw 1 is reversed and the pin replaced, as shown in Fig. 3, jaw 5 remaining on the pipe while the change of parts is made. The pipe is now gripped between the teeth 7 and the teeth 2; but by the peculiar relationship the curves of the teeth have with each other and when pressure is applied to handle 4, as shown by arrow *b*, Fig. 3, the pipe is engaged at diametrically opposite points and is accordingly turned in a direction opposite to that when the parts are assembled, as shown in Fig. 2.

The fact that I utilize but one set of teeth on the face of jaw 1 to coöperate with the teeth of jaw 2 to turn a pipe toward the right or left makes it essential that the parts be so arranged as will permit the jaws to pass each other. Hence I bifurcate jaw 5, and jaw 1 operates freely between the sides thereof. This construction serves the very important function of enabling me to handle a much larger pipe than could otherwise be handled. Furthermore, the pipe is gripped on one side by two series of teeth 7, the teeth 2 forming an intermediate gripping medium.

Having thus described my invention, what I claim is—

1. A wrench comprising a curved jaw formed on its inner surface with teeth, a reversible lever member formed with teeth on one surface only, said teeth of the lever member being adapted to coöperate with the teeth of the jaw in either position, the reversing of the lever member changing the direction of movement of the article being operated upon.

2. A wrench comprising a hook-shaped jaw formed on its inner surface with teeth, a reversible lever member formed with teeth on one surface only, said teeth of the lever member being adapted to coöperate with the jaw-teeth near the middle thereof when said lever member is in one position, and with the teeth near the free hooked end of the jaw when in a reverse position.

3. A wrench comprising a jaw formed with a pipe-gripping edge, a lever-jaw arranged for movable and reversible connection with said pipe-gripping jaw, said lever-jaw being formed with a single pipe-gripping edge to coöperate with the pipe-gripping edge of the jaw in either position of the lever-jaw.

In testimony whereof I have affixed my signature in presence of two subscribing witnesses.

JOSEPH HARTIGAN.

Witnesses:
M. A. KING,
SAMUEL NEEL.